United States Patent
Zou et al.

(10) Patent No.: US 12,132,396 B2
(45) Date of Patent: Oct. 29, 2024

(54) NITRIDE-BASED POWER FACTOR CORRECTION CIRCUIT AND METHOD FOR IMPLEMENTING THE SAME

(71) Applicant: INNOSCIENCE (SUZHOU) SEMICONDUCTOR CO., LTD., Suzhou (CN)

(72) Inventors: Yanbo Zou, Suzhou (CN); Fada Du, Suzhou (CN); Chao Tang, Suzhou (CN)

(73) Assignee: INNOSCIENCE (SUZHOU) SEMICONDUCTOR CO., LTD., Suzhou (CN)

( * ) Notice: Subject to any disclaimer, the term of this patent is extended or adjusted under 35 U.S.C. 154(b) by 0 days.

(21) Appl. No.: 17/778,022

(22) PCT Filed: Mar. 4, 2022

(86) PCT No.: PCT/CN2022/079245
§ 371 (c)(1),
(2) Date: May 19, 2022

(87) PCT Pub. No.: WO2023/164920
PCT Pub. Date: Sep. 7, 2023

(65) Prior Publication Data
US 2024/0305191 A1    Sep. 12, 2024

(51) Int. Cl.
*H02M 1/42* (2007.01)
*G05F 1/56* (2006.01)
*H02M 7/06* (2006.01)

(52) U.S. Cl.
CPC ............ *H02M 1/4208* (2013.01); *G05F 1/56* (2013.01); *H02M 7/06* (2013.01)

(58) Field of Classification Search
CPC .... H02M 1/42; H02M 1/4208; H02M 1/4225; H02M 1/4258; H02M 7/06; H02M 7/062;
(Continued)

(56) References Cited

U.S. PATENT DOCUMENTS

| | | | | |
|---|---|---|---|---|
| 5,793,626 A | * | 8/1998 | Jiang ...................... | H02M 1/10 323/284 |
| 2006/0232253 A1 | * | 10/2006 | Salato ..................... | H02M 1/36 323/225 |

(Continued)

FOREIGN PATENT DOCUMENTS

| CN | 102106069 A | | 6/2011 |
|---|---|---|---|
| CN | 103516194 A | * | 1/2014 |

(Continued)

OTHER PUBLICATIONS

International Search Report and Written Opinion of the corresponding PCT application No. PCT/CN2022/079245 mailed on Nov. 25, 2022.

*Primary Examiner* — Thienvu V Tran
*Assistant Examiner* — Shahzeb K Ahmad
(74) *Attorney, Agent, or Firm* — Li & Cai Intellectual Property (USA) Office

(57) ABSTRACT

The present invention provides a nitride-based power factor correction (PFC) circuit for improving power distribution efficiency from an AC power supply to a load. The PFC circuit comprises a nitride-based bidirectional switch and a controlling circuit having a first switching node and a second switching node electrically coupled to a first control terminal and a second control terminal of the bidirectional switch respectively. The provided nitride-based PFC circuit has high efficiency over a broad range of input voltage, a simpler circuit topology with smaller component size.

18 Claims, 11 Drawing Sheets

(58) Field of Classification Search
CPC .......... H02M 7/12; H02M 7/155; H02M 7/21; H02M 7/217; G05F 1/56
See application file for complete search history.

(56) References Cited

U.S. PATENT DOCUMENTS

| | | | |
|---|---|---|---|
| 2007/0279955 A1* | 12/2007 | Liu | H02M 1/4225 363/125 |
| 2010/0124085 A1* | 5/2010 | Zeng | H02M 1/4208 363/101 |
| 2011/0013436 A1* | 1/2011 | Gan | H02M 1/4225 363/126 |
| 2013/0265096 A1 | 10/2013 | Gotou et al. | |
| 2021/0273566 A1 | 9/2021 | Sigamani | |
| 2021/0288574 A1 | 9/2021 | Cohen | |
| 2023/0327544 A1* | 10/2023 | Jung | H02M 1/0006 363/127 |

FOREIGN PATENT DOCUMENTS

| | | | | |
|---|---|---|---|---|
| CN | 111327186 A | * | 6/2020 | |
| CN | 114128117 A | | 3/2022 | |
| EP | 2309633 A1 | * | 4/2011 | ............ H02M 5/297 |

\* cited by examiner

NITRIDE-BASED POWER FACTOR CORRECTION CIRCUIT AND METHOD FOR IMPLEMENTING THE SAME

TECHNICAL FIELD

The subject application generally relates to a power factor correction (PFC) circuit, and more particularly relates to a PFC circuit using Gallium Nitride (GaN) bidirectional switch.

BACKGROUND OF THE INVENTION

With the rapid development of power electronic technology and its wide application in all aspects of life, harmonics injected into the power grid by power electronic switching power supplies have become the main source of harmonic pollution in the power grid. In order to solve the problem of harmonic pollution from the power source, power factor correction (PFC) technology is widely used.

Conventionally, silicon devices, such as high voltage silicon diodes and transistors, have been utilized in power conversion circuits. For example, a silicon high voltage metal oxide semiconductor field effect transistor (Si MOSFET) has been utilized as a high voltage switch in a PFC boost circuit. Owing to their high threshold voltages, the silicon devices store a large amount of charge when conducting current and the large amount of stored charge can undesirably limit their efficiency and operating frequency, especially for some low voltage applications.

SUMMARY OF THE INVENTION

One object of the subject application is to provide a power factor correction circuit which has high efficiency over a broad range of input voltage, and has smaller number of components.

According to one aspect of the subject application, the present invention provides a nitride-based power factor correction (PFC) circuit for improving power distribution efficiency from an AC power supply to a load. The PFC circuit comprises: a pair of first and second input terminals coupled to the AC power supply; a pair of first and second output terminals coupled to the load; a coil having a first end connected to the first input terminal; a nitride-based bidirectional switch having a first conduction terminal connected to a second end of the coil and a second conduction terminal connected to the second input terminal; a first capacitor having a first end connected to the first output terminal and a second end connected to the second output terminal; a rectifying circuit coupled between the AC power supply and the load; and a controlling circuit having a first switching node and a second switching node electrically coupled to a first control terminal and a second control terminal of the bidirectional switch respectively.

BRIEF DESCRIPTION OF THE DRAWINGS

Aspects of the present disclosure may be readily understood from the following detailed description with reference to the accompanying figures. The illustrations may not necessarily be drawn to scale. That is, the dimensions of the various features may be arbitrarily increased or reduced for clarity of discussion. There may be distinctions between the artistic renditions in the present disclosure and the actual apparatus due to manufacturing processes and tolerances. Common reference numerals may be used throughout the drawings and the detailed description to indicate the same or similar components.

DETAILED DESCRIPTION

In the following description, preferred examples of the present disclosure will be set forth as embodiments which are to be regarded as illustrative rather than restrictive. Specific details may be omitted so as not to obscure the present disclosure; however, the disclosure is written to enable one skilled in the art to practice the teachings herein without undue experimentation.

Figure 1:
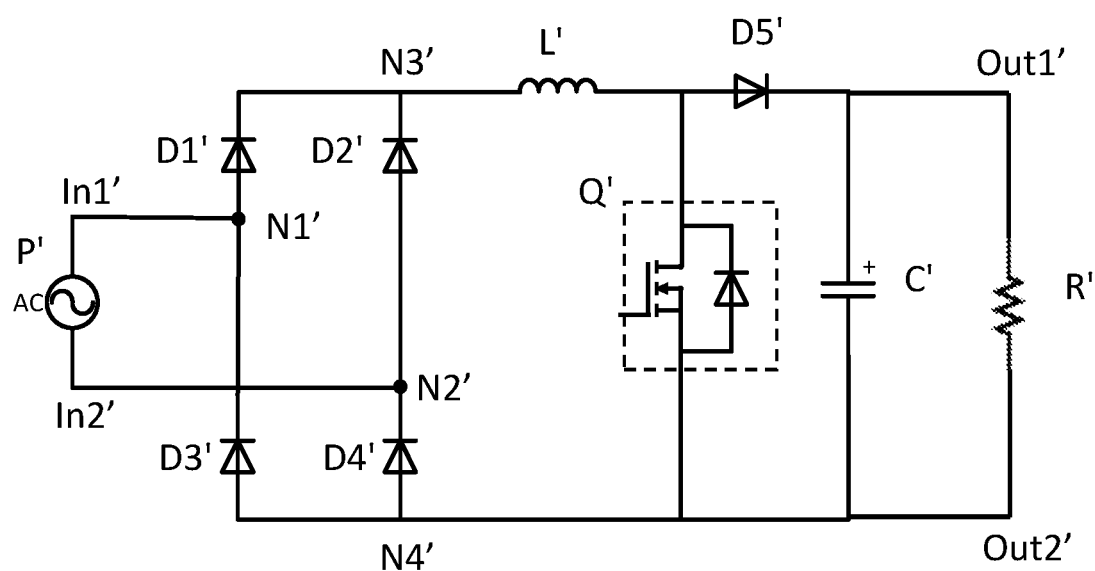
FIG. 1 depicts a circuit diagram of a PFC circuit according to a comparative embodiment of the present invention.

FIG. 1 depicts a circuit diagram of a PFC circuit 1' according to a comparative embodiment of the present invention. As shown, the PFC circuit includes a pair of first and second input terminals Int1', Int2' configured to couple to an AC power source P'; and a pair of first and second output terminals Out1', Out2' configured to couple to a load R'; a coil (or inductor) L', didoes D1' to D5', a Si MOSFET S' and a capacitor C'.

The diodes D1' to D4' constitute a full-bridge rectifier. An anode of the diode D1' is connected to a cathode of the diode D3' at a node N1'; an anode of the diode D2' is connected to a cathode of the diode D4' at a node N2'; a cathode of the diode D1' is connected to a cathode the diode D2' at a node N3'; and an anode of the diode D3' is connected to an anode of the diode D4' at a node N4'.

The nodes N1' and N2' of the full-bridge rectifier are connected to the first and second input terminals In1', In2' of the PFC circuit respectively. One end of the coil L' is connected to the node N3'. The other end of the coil L' is connected to an anode of the diode D5' and a drain of the Si MOSFET S'. One end of the capacitor C' is connected to a cathode of the diode D5' and the first output terminal Out1' of the PFC circuit. The other end of the capacitor C' is connected to a source of the Si MOSFET S', the node N4' of the full-bridge rectifier and the second output terminal Out2' of the PFC circuit.

Figure 2A:
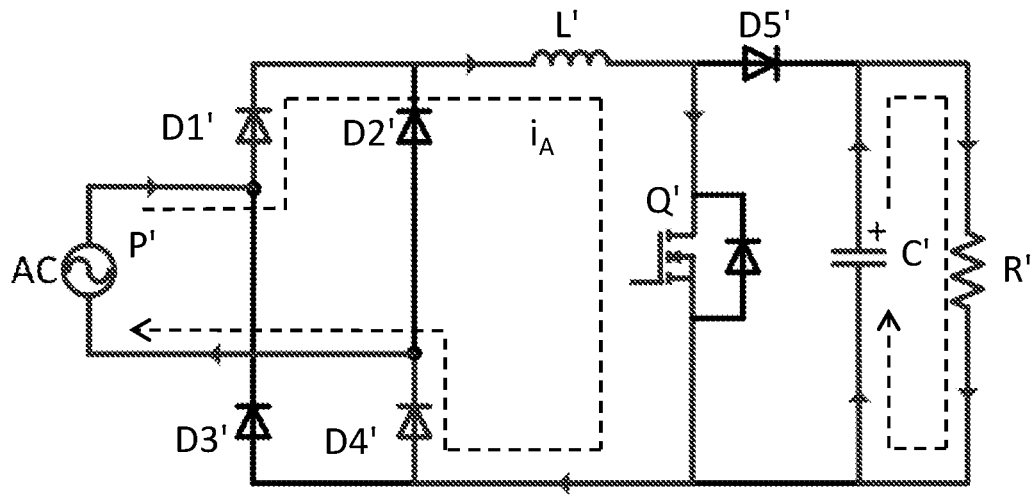
FIGS. 2A-2B show current paths in the PFC circuit of FIG. 1 under an on-state and an off-state of a Si MOSFET respectively at a positive half-cycle (that is when a positive voltage is supplied by the AC power source)
Figure 2B:
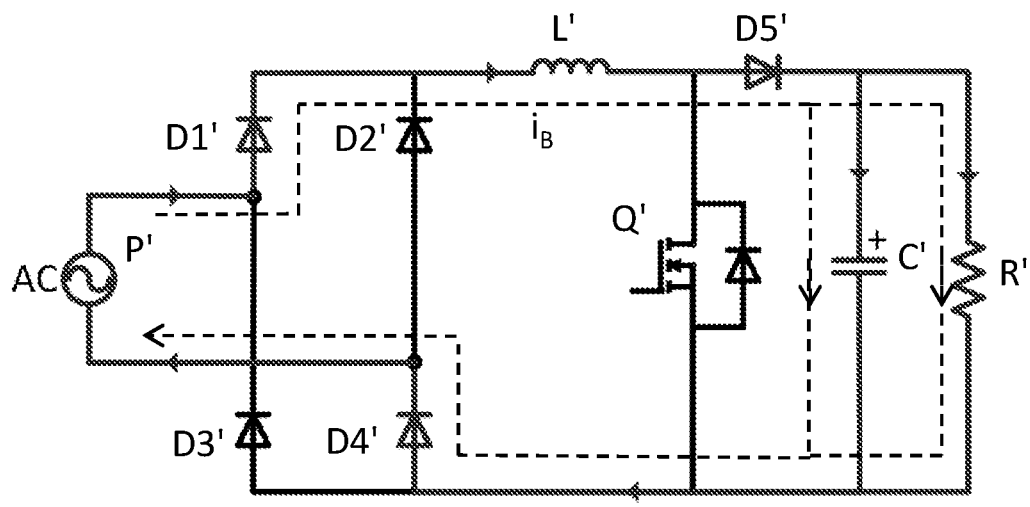
Figure 2C:
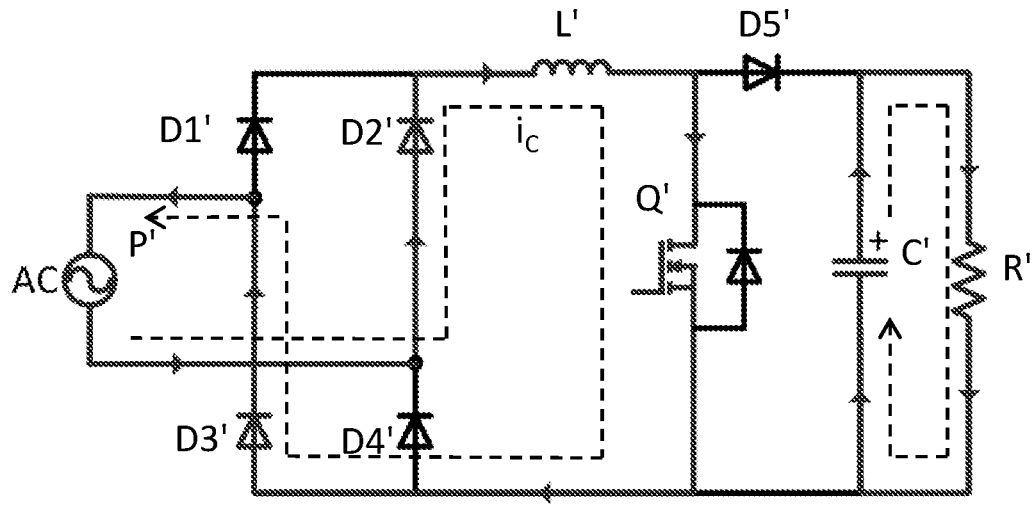
FIGS. 2C and 2D show current paths in the PFC circuit of FIG. 1 under the on-state and the off-state of a Si MOSFET respectively at a negative half-cycle.
Figure 2D:
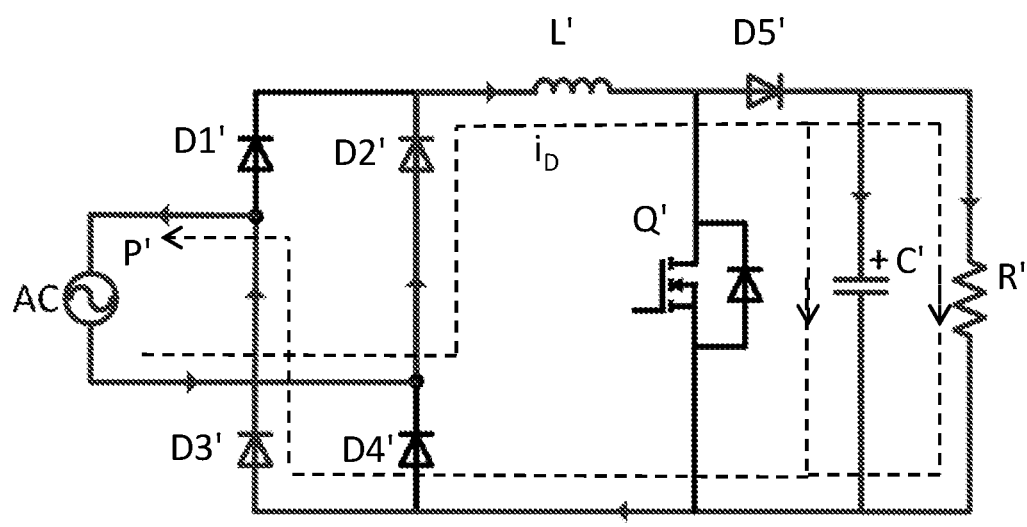

FIGS. 2A-2B show current paths in the PFC circuit 1' under an on-state and an off-state of the Si MOSFET S' respectively at a positive half-cycle (that is when a positive voltage is supplied by the AC power source) while FIGS. 2C and 2D show current paths in the PFC circuit 1' under the on-state and the off-state of the Si MOSFET S' respectively at a negative half-cycle (that is when a negative voltage is supplied by the AC power source).

Referring to FIG. 2A, when the PFC circuit 1' is operated at the positive half-cycle and the Si MOSFET S' is switched to the on-state, a main current $i_A$ flows from the first terminal to the second terminal of the AC power source via a path including the diode D1', the coil L', the Si MOSFET S' and the diode D4'. An input voltage from the AC power source is applied to the coil L' and energy is stored in the coil L'. Charges stored in the capacitor C' is released to the load R' through a discharging current to apply an output voltage to the load R'.

Referring to FIG. 2B, when the PFC circuit is operated at the positive half-cycle and the Si MOSFET S' is switched to the off-state, a main current $i_B$ flows from the first terminal to the second terminal of the AC power source via a path include the diode D1', the coil L', the diode D5', the capacitor C' and the load R' connected in parallel and the diode D4'. Energy stored in the coil L' is released to the capacitor C' and the load R'. Simultaneously, the input voltage from the AC power source is applied to the capacitor C' and the load R'.

Referring to FIG. 2C, when the PFC circuit 1' is operated at the negative half-cycle and the Si MOSFET S' is switched to the on-state, a main current $i_C$ flows from the second terminal to the first terminal of the AC power source via a path including the diode D2', the coil L', the Si MOSFET S' and the diode D3'. The input voltage from the AC power source is applied to the coil L' and energy is stored in the coil L'. Charges stored in the capacitor C' is released to the load R' through a discharging current to apply an output voltage to the load R'.

Referring to FIG. 2D, when the PFC circuit is operated at the negative half-cycle and the Si MOSFET S' is switched to the off-state, a main current $i_D$ flows from the second terminal to the first terminal of the AC power source via a path include the diode D2', the coil L', the diode D5', the capacitor C' and the load R' connected in parallel and the diode D3'. Energy stored in the coil L' is released to the capacitor C' and the load R'. Simultaneously, the input voltage from the AC power source is applied to the capacitor C' and the load R'.

The PFC circuit 1' in FIG. 1 has two problems. One problem is that when the Si MOSFET S' is switched to the on-state, the main currents ($i_A$ and $i_C$) have to flow through two diodes and when the Si MOSFET S' is switched to the off-state, the main currents ($i_B$ and $i_D$) have to flow through three diodes, which cause high power consumption. Especially when the input voltage is low (e.g., in a range from 90 Vac to 264 Vac), the power conversion efficiency is low. Moreover, as the PFC circuit is based on Si MOSFET, owning to characteristics of Si, the operating frequency of PFC circuit cannot be further increased and component size cannot be further reduced.

Figure 3:
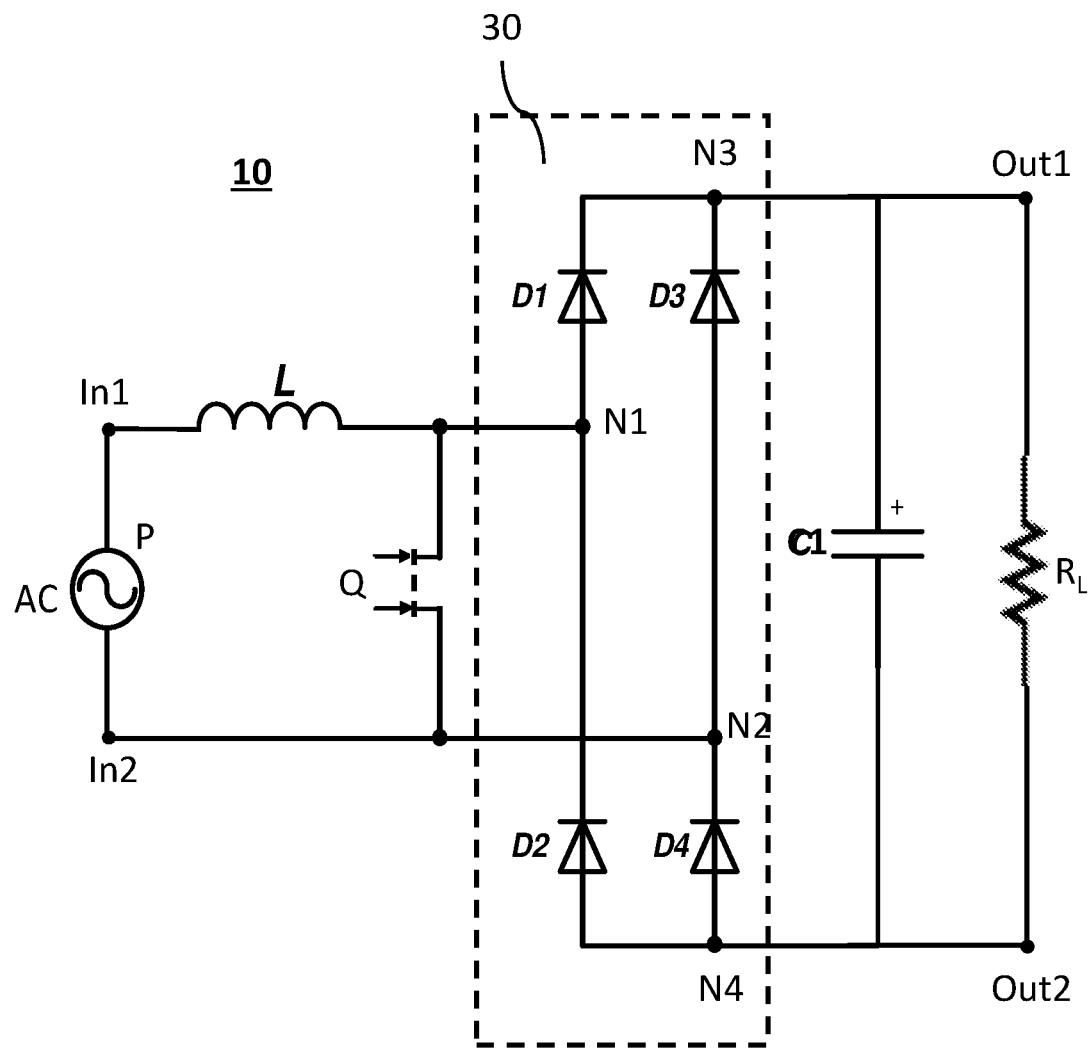
FIG. 3 depicts a circuit diagram of a PFC circuit according to one embodiment of the present invention.

FIG. 3 depicts a circuit diagram of a PFC circuit 10 according to one embodiment of the present invention. As shown, the PFC circuit 10 comprises a pair of input terminals In1, In2 configured to couple to first and second terminals of an AC power source P respectively and a pair of output terminals Out1, Out2 configured to couple to a load $R_L$. The PFC circuit 10 further comprises a coil (or inductor) L, a bidirectional switch Q, a capacitor C1 and a rectifying circuit 30.

The coil L may have one end connected to the first input terminal In1. The bidirectional switch Q may have a first conduction terminal connected to the other end of the coil L and a second conduction terminal connected to the second input terminal In2. The capacitor C1 may have one end connected to the first output terminal Out1 and the other end connected to the second output terminal Out2.

The rectifying circuit 30 may have a first node N1 connected to the other end of the coil L; a second node N2 connected to the second input terminal In2; a third node N3 connected to the first output terminal Out 1 and a fourth node N4 connected to the second output terminal Out2.

Preferably, the rectifying circuit 30 may include a diode D1 connected between the coil L and the first output terminal so as to allow a current to flow from the coil L to the first output terminal. The rectifying circuit 30 may include a diode D2 connected between the second output terminal and the coil L so as to allow a current to flow from the second output terminal to the coil L. The rectifying circuit 30 may include a diode D3 connected between the second input terminal and the first output terminal so as to allow a current to flow from the second input terminal to the first output terminal. The rectifying circuit 30 may include a diode D4 connected between the second output terminal and the second input terminal so as to allow a current to flow from the second output terminal to the second input terminal.

The diode D1 may have an anode connected to the coil L through node N1 and a cathode connected to the first output terminal through node N3. The diode D2 may have an anode connected to the second output terminal through node N4 and a cathode connected to the coil L through node N1. The diode D3 may have an anode connected to the second input terminal through node N4 and a cathode connected to the first output terminal through node N3. The diode D4 may have an anode connected to the second output terminal through node N4 and a cathode connected to the second input terminal through node N2.

Figure 4A:
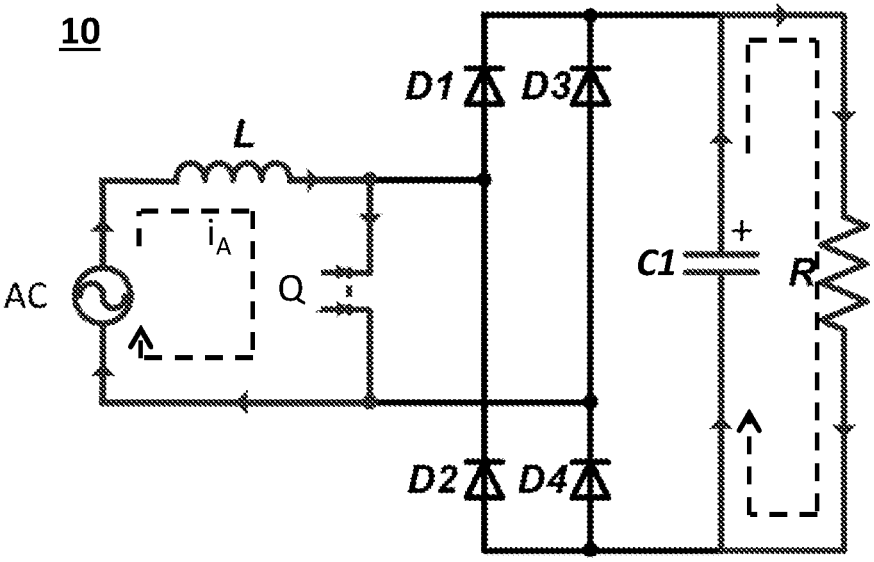
FIGS. 4A-4B show current paths in the PFC circuit of FIG. 3 under an on-state and an off-state of a bidirectional switch respectively at a positive half-cycle.
Figure 4B:
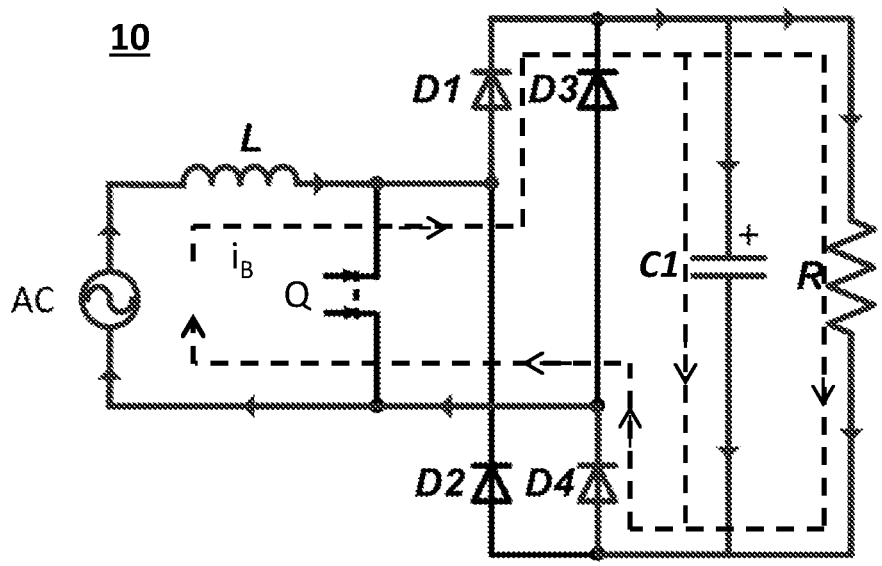
Figure 4C:
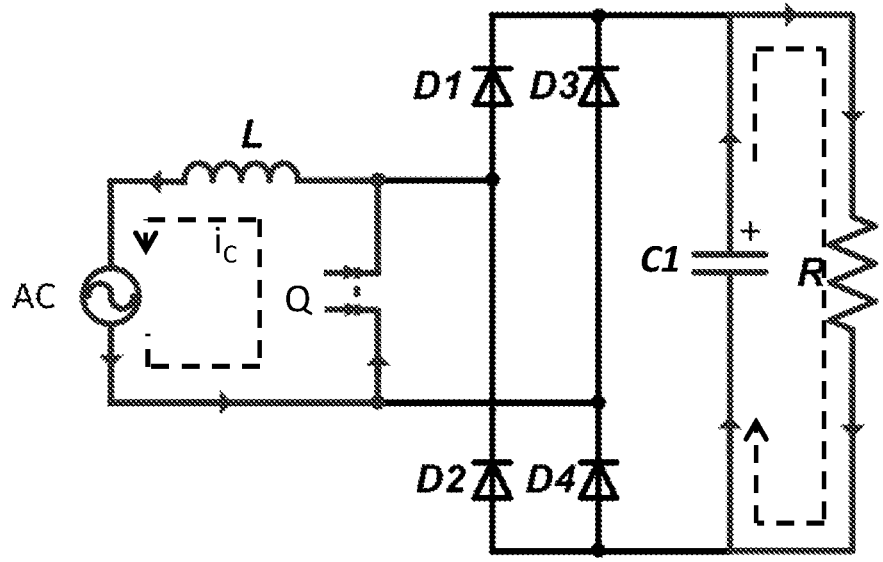
FIGS. 4C and 4D show current paths in the PFC circuit of FIG. 3 under the on-state and the off-state of a bidirectional switch respectively at a negative half-cycle.
Figure 4D:
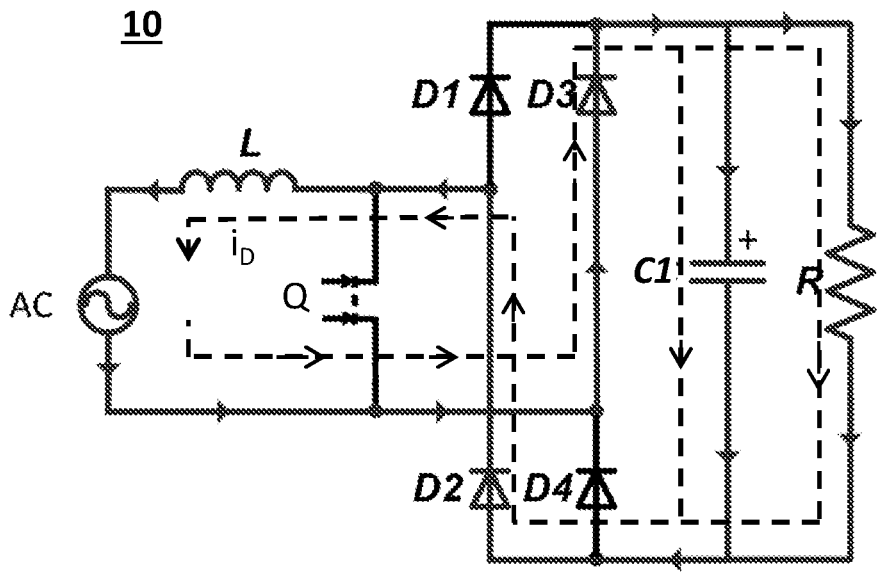

FIGS. 4A-4B show current paths in the PFC circuit 10 under an on-state and an off-state of the bidirectional switch Q respectively at a positive half-cycle (that is when a positive voltage is supplied by the AC power source). FIGS. 4C and 4D show current paths in the PFC circuit 10 under the on-state and the off-state of the bidirectional switch Q respectively at a negative half-cycle (that is when a negative voltage is supplied by the AC power source).

Referring to FIG. 4A, when the AC power source supplies a positive input voltage and the bidirectional switch Q is switched to the on-state, a main current $i_A$ is facilitated to flow from the first terminal to the second terminal of the AC power source (i.e., from In1 to In2) along a current path including the coil L and the bidirectional switch Q. The electrical energy supplied by the AC power source is stored in the coil L. Charges stored in the capacitor C1 is released to the load R through a discharging current to apply an output voltage to the load R.

Referring to FIG. 4B, when the AC power source supplies a positive input voltage and the bidirectional switch Q is switched to the off-state, a main current $i_B$ is facilitated to flow from the first terminal to the second terminal of the AC power source (i.e., from In1 to In2) along a current path including the coil L, the diode D1, the capacitor C1 and the load R connected in parallel and the diode D4. Energy stored in the coil L is released to the capacitor C1 and load R. Simultaneously, and the input voltage from the AC power source is applied to the capacitor C1 and load R.

Referring to FIG. 4C, when the AC power source supplies a negative input voltage and the bidirectional switch Q is switched to the on-state, a main current $i_C$ is facilitated to flow from the second terminal to the first terminal of the AC power source (i.e., from In2 to In1) along a current path including the bidirectional switch Q and the coil L. The electrical energy supplied by the AC power source is stored in the coil L. Charges stored in the capacitor C is released to the load R through a discharging current to apply an output voltage to the load R.

Referring to FIG. 4D, when the AC power source supplies a negative input voltage and the bidirectional switch Q is switched to the off-state, a main current $i_D$ is facilitated to flow from the second terminal to the first terminal of the AC power source along a current path including the diode D3, the capacitor C and the load R connected in parallel, the diode D2 and the coil L. Energy stored in the coil L is released to the capacitor C and the load R. Simultaneously, the input voltage from the AC power source is applied to the capacitor C and the load R.

It can be seen from FIGS. 4A-4D that the bridgeless PFC circuit 10 of FIG. 3 provided by the present invention has a simpler circuit topology that the conventional PFC circuit 1' of FIG. 1. There is no current flowing through the diodes when the bidirectional switch Q is switched to the on-state; and current flows through only one diode when the bidirectional switch Q is switched to the off-state. Therefore, the power consumption can be greatly reduced and the power conversion efficiency can be greatly increased. The use of GaN transistor can also increase the operation frequency and reduce the component size.

The bidirectional switch Q may be a nitride-based dual-gate having a drain (D) electrode being the first conduction terminal; a source (S) electrode being the second conduction terminal; a first gate (G1) electrode being the first control terminal; and a second gate (G2) electrode being the second control terminal. The nitride-based dual-gate transistor is a nitride-based dual-gate high-electron-mobility transistor (HEMT). The nitride-based dual-gate HEMT is a nitride-based dual-gate enhancement-mode (E-mode) HEMT. The nitride-based dual-gate E-mode HEMT is a AlGaN/GaN dual-gate E-mode HEMT.

To switch on the switch Q in both directions, that is, in a bidirectional manner, a voltage $V_{G1S}$ applied across the first gate electrode and the source electrode of the switch Q and a voltage $V_{G2D}$ applied across the second gate electrode and the drain electrode of the switch Q should be greater than a threshold voltage Vth of the bidirectional switch Q simultaneously. To switch off the switch Q in both directions, that is, in a bidirectional manner, the voltage $V_{G1S}$ and the voltage $V_{G2D}$ should be smaller than the threshold voltage Vth simultaneously. In other words, for operating the bidirectional switch Q, the voltages $V_{G1S}$ and $V_{G2D}$ should be synchronized and substantially equal to each other, i.e., $V_{G1S}=V_{G2D}$.

Figure 5:
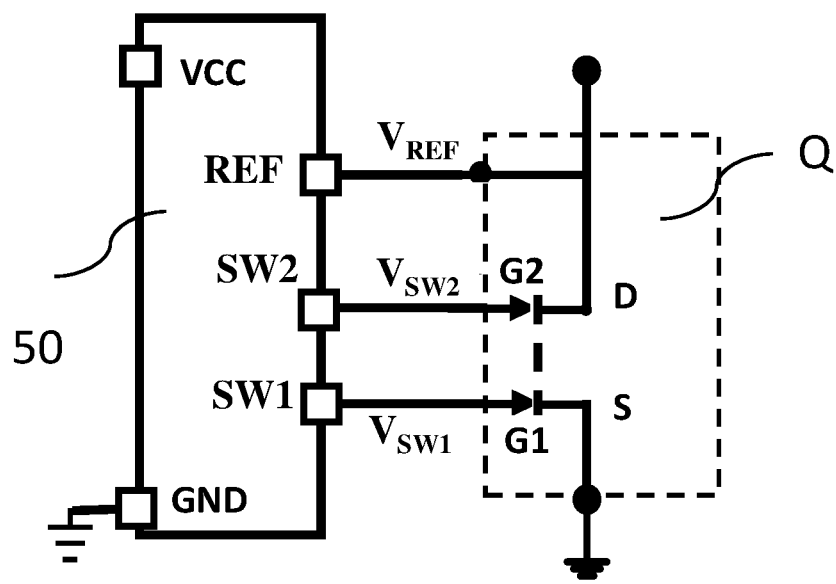
FIG. 5 depicts how a controlling circuit electrically coupled to a bidirectional switch according to one embodiment of the present invention.

Referring to FIG. 5, the PFC circuit 10 may further include a controlling circuit 50 electrically coupled to the first control terminal and second control terminal of the bidirectional switch Q and configured for controlling the switch Q in a bidirectional manner. The controlling circuit 50 may comprise a power input node VCC configured for electrically connecting to a DC power supply (not shown); a ground node GND configured for electrically connecting to a ground GND; a first switching node SW1 configured for transmitting a first switching signal $V_{SW1}$ to the first control terminal (i.e. the first gate electrode G1) of the bidirectional switch Q, a second switching node SW2 configured for transmitting a second switching signal $V_{SW2}$ to the second control terminal (i.e. the first gate electrode G1) of the bidirectional switch Q; and a reference node REF configured for electrically connecting to the first conduction terminal (i.e., the drain electrode D) of the bidirectional switch Q and providing a reference voltage $V_{REF}$ to the second conduction terminal (i.e., the drain electrode D) of the bidirectional switch Q. The voltage $V_{G1S}$ applied across the first gate electrode and the source of the switch Q may then be given by $V_{G1S}=V_{SW1}$. The voltage $V_{G2D}$ applied across the second gate electrode and the drain electrode of the switch Q may then be given by $V_{G2D}=V_{SW2}-V_{REF}$.

Figure 6:
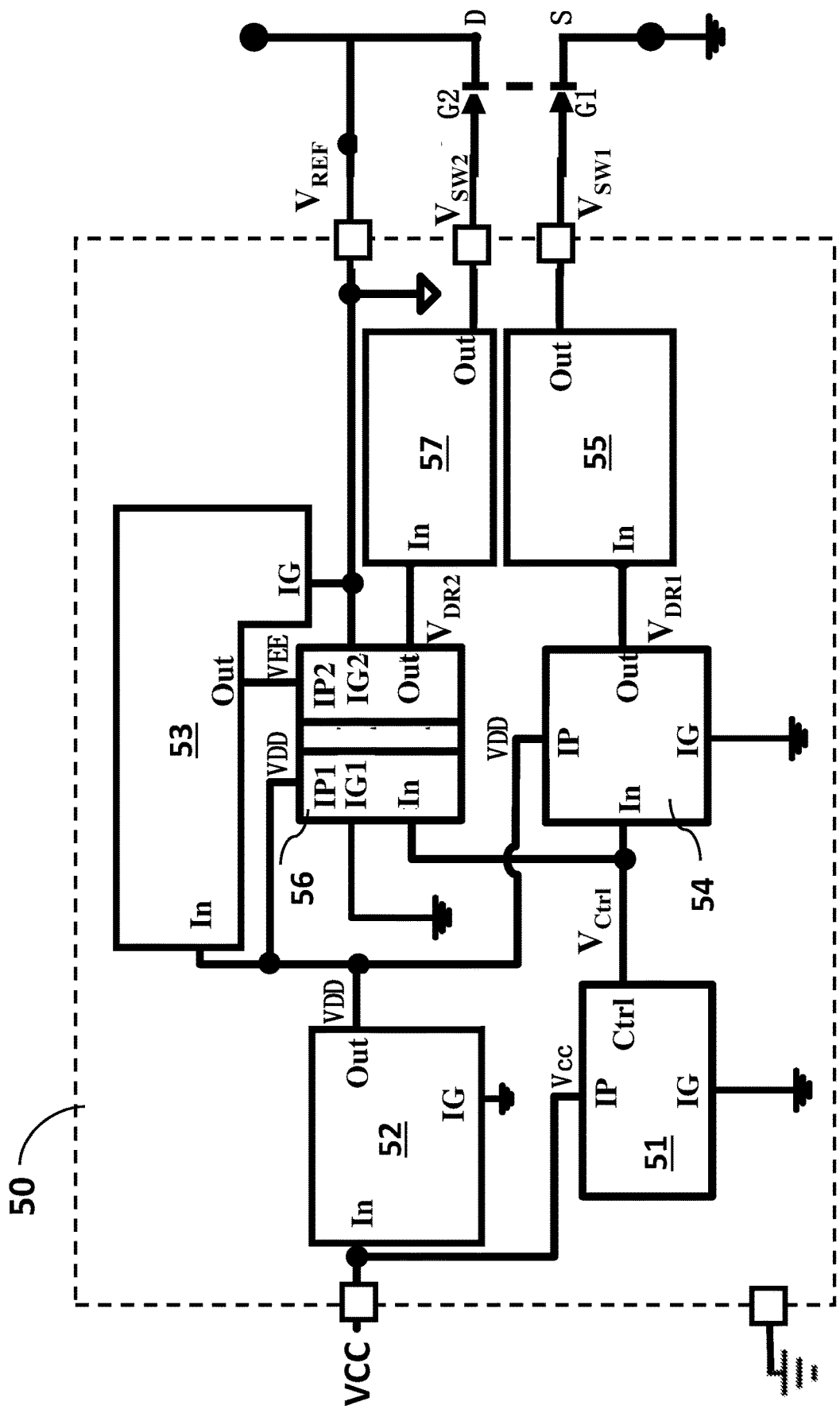
FIG. 6 depicts a circuit block diagram of the controlling circuit according to one embodiment of the present invention.

FIG. 6 depicts a circuit block diagram of the controlling circuit 50 according to one embodiment of the present invention. For simplicity, terminals/nodes having the same functionality, such as input terminals, output terminals, reference terminals, internal power terminals, internal ground terminals from different modules/circuits will be denoted inside the relevant blocks with the same labels, such as "In", "Out", "Ref", "IP" and "IG".

Referring to FIG. 6, the controlling circuit 50 may comprise a controller 51 configured for generating a main control signal $V_{Ctrl}$ for controlling the bidirectional switch Q. The controller 51 may comprise an internal power (IP) terminal, an internal ground (IG) terminal and a control output (Ctrl) terminal. The internal power terminal may be connected to the VCC node of the controlling circuit 50; the internal ground terminal may be connected to the GND node of the controlling circuit 50. The control output terminal may be configured to transmit the main control signal $V_{Ctrl}$.

The controlling circuit 50 may further comprise a low-dropout module 52 configured for receiving the DC power supply and generating a regulated voltage $V_{DD}$. The low-dropout module 52 may have an input (In) terminal, an output (Out) terminal and an internal ground (IG) terminal. The input terminal of the low-dropout module 52 may be connected to the VCC node of the controlling circuit 50. The internal ground terminal of the low-dropout module 52 may be connected to the GND node of the controlling circuit 50. The output terminal of the low-dropout module 52 may be configured to transmit the regulated voltage $V_{DD}$.

The controlling circuit 50 may further comprise a step-up converter 53 connected to the low-dropout module 52 and configured for receiving the regulated voltage $V_{DD}$ and generating a stepped-up voltage $V_{EE}$. The step-up converter 52 may have an input (In) terminal, an output (Out) terminal and an internal ground (IG) terminal. The input terminal of the step-up converter 53 may be connected to the output terminal of the low-dropout module 52. The internal ground terminal of the step-up converter 53 may be connected to the REF node of the controlling circuit 50. The output terminal of the step-up converter 53 may be configured to transmit the stepped-up voltage $V_{EE}$.

The controlling circuit 50 may further comprise a non-isolation driver 54 connected to the controller 51 and the low dropout module 52, and configured for receiving the main control signal $V_{Ctrl}$ and the regulated voltage $V_{DD}$, and generating a driving signal $V_{DR1}$. The non-isolation driver 54 may have an input (In) terminal, an output (Out) terminal, an internal power terminal (IP), a secondary internal power terminal (IP2) a primary internal ground (IG1) terminal and a secondary internal ground (IG2) terminal. The input terminal of the non-isolation driver 54 may be connected to the control output terminal of the controller 51. The internal power terminal of the non-isolation driver 54 may be connected to the output terminal of the low-dropout module 52. The internal ground terminal of the non-isolation driver 54 may be connected to the GND node of the controlling circuit 50. The output terminal of the non-isolation driver 54 may be configured to transmit the driving signal $V_{DR1}$.

The controlling circuit 50 may further comprise a delay module 55 connected to the non-isolation driver 54 and configured for receiving the driving signal $V_{DR1}$ and generating a switching signal $V_{SW1}$ to the first control terminal (G1) of the bidirectional switch Q. The delay module 55 may comprise an input (In) and an output (Out) terminal. The input terminal of the delay module 55 may be connected to the output terminal of the driver 54. The output terminal of the delay module 55 may be connected to the first switching node SW1 of the controlling circuit 50.

The controlling circuit 50 may further comprise an isolation driver 56 connected to the controller 51, the low dropout module 52 and the step-up converter 53, and configured for receiving the main control signal $V_{Ctrl}$, the regulated voltage $V_{DD}$ and the stepped-up voltage $V_{EE}$, and generating a driving signal $V_{DR2}$. The isolation driver 56 may have an input (In) terminal, an output (Out) terminal, a primary internal power (IP1) terminal, a secondary internal power (IP2) terminal, a primary internal ground (IG1) terminal and a secondary internal ground (IG2) terminal. The input terminal of the isolation driver 56 may be connected to the control output terminal of the controller 51. The primary internal power terminal of the isolation driver 56 may be connected to the output terminal of the low-dropout module 52. The secondary internal power terminal of the isolation driver 56 may be connected to the output terminal of the step-up converter 53. The primary internal ground terminal of the isolation driver 56 may be connected to the GND node of the controlling circuit 50. The secondary internal ground terminal of the isolation driver 56 may be connected to the REF node of the controlling circuit 50. The output terminal of the isolation driver 56 may be configured to transmit the driving signal $V_{DR2}$.

The controlling circuit 50 may further comprise a delay module 57 connected to the isolation driver 56 and configured for receiving the driving signal $V_{DR2}$ and generating a switching signal $V_{SW2}$ to the second control terminal (G2) of the bidirectional switch Q. The delay module 57 may comprise an input (In) and an output (Out) terminal. The input terminal of the delay module 57 may be connected to the output terminal of the isolation driver 56. The output terminal of the delay module 55 may be connected to the second switching node SW2 of the controlling circuit 50.

Figure 7:
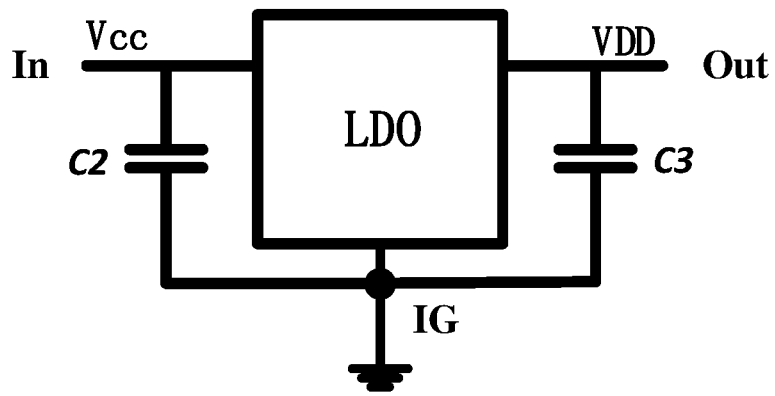
FIG. 7 shows an exemplary circuit diagram of the low-dropout module according to one embodiment of the present invention.

FIG. 7 shows an exemplary circuit diagram of the low-dropout module 52 according to one embodiment of the present invention. As shown, the low-dropout module 52 may include a low-dropout regulator (LDO), a capacitor C2 and a capacitor C3. The low-dropout regulator LDO may have an input connected to the input terminal of the low-dropout module 52, an output connected to the output terminal of the low-dropout module 52 and a ground connected to the internal ground terminal of the low-dropout module 52. The capacitor C2 may have one end connected to the input terminal of the low-dropout module 52 and the other end connected to the internal ground terminal of the low-dropout module 52. The capacitor C3 may have one end connected to the output terminal of the low-dropout module 52 and the other end connected to the internal ground terminal of the low-dropout module 52.

Figure 8:
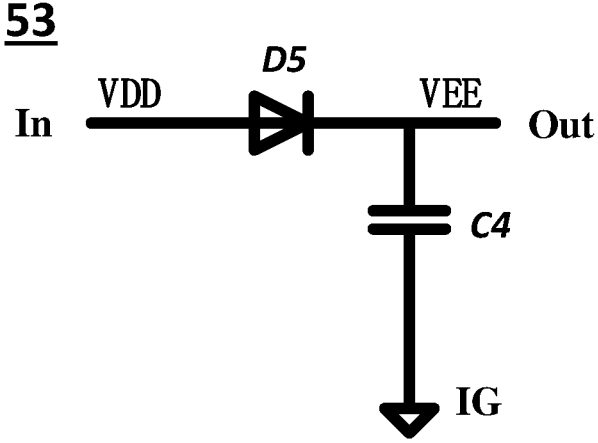
FIG. 8 shows an exemplary circuit diagram of the step-up converter according to one embodiment of the present invention.

FIG. 8 shows an exemplary circuit diagram of the step-up converter 53 according to one embodiment of the present invention. As shown, the step-up converter 53 may include a diode D5 and a capacitor C4. The diode D5 may have an anode connected to the input terminal of the step-up converter 53 and a cathode connected to the output terminal of the step-up converter 53. The capacitor C4 may have one end connected to the output terminal of the step-up converter 53 and the other end connected to the internal ground terminal of the step-up converter 53.

Figure 9:
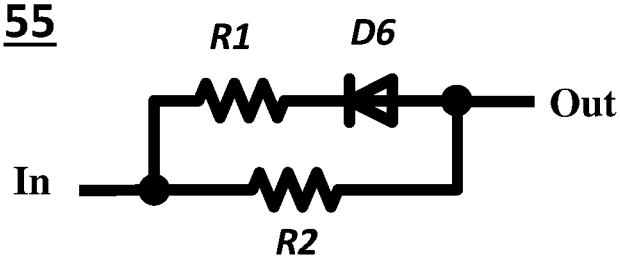
FIG. 9 shows an exemplary circuit diagram of a first delay module according to one embodiment of the present invention.

FIG. 9 shows an exemplary circuit diagram of the delay module 55 according to one embodiment of the present invention. As shown, the delay module 55 may include a resistor R1, a resistor R2 and a diode D6. The resistor R1 may have one end connected to the input terminal of the delay module 55 and the other end connected to a cathode of the diode D6. The resistor R2 may have one end connected to the input terminal of the delay module 55 and the other end connected to the output terminal of the delay module 55. The diode D6 may have an anode connected to the output terminal of the delay module 55.

Figure 10:
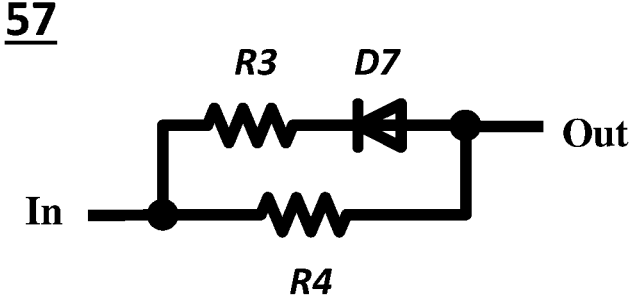
FIG. 10 shows an exemplary circuit diagram of a second delay module according to one embodiment of the present invention.

FIG. 10 shows an exemplary circuit diagram of the delay module 57 according to one embodiment of the present invention. As shown, the delay module 57 may include a resistor R3, a resistor R4 and a diode D7. The resistor R3 may have one end connected to the input terminal of the delay module 57 and the other end connected to a cathode of the diode D7. The resistor R4 may have one end connected to the input terminal of the delay module 57 and the other end connected to the output terminal of the delay module 57. The diode D7 may have an anode connected to the output terminal of the delay module 57.

The inductance of the coil L may range approximately from 100 µH to 1000 µH. The capacitance of capacitor C1 may range approximately from 100 µF to 470 µF; the capacitance of capacitor C2 may range approximately from 1 µF to 10 µF; the capacitance of capacitor C3 may range approximately from 1 µF to 10 µF; and the capacitance of capacitor C4 may range approximately from 1 µF to 10 µF.

The resistance of resistor R1 may range approximately from 1Ω to 20Ω; the resistance of resistor R2 may range approximately from 10Ω to 1000Ω; the resistance of resistor R3 may range approximately from 1Ω to 20Ω; and the resistance of resistor R4 may range approximately from 10Ω to 1000Ω. Preferably, the resistor R1, the resistor R2, the resistor R3 and the resistor R4 are adjustable resistors, such as rheostats.

In some embodiments, the nitride-based bidirectional switch Q and the controlling circuit 50 may be integrated in an integrated circuit (IC) chip. In some embodiments, the coil L, the nitride-based bidirectional switch Q, the capacitor C1 and the rectifying circuit 30 may be integrated in an integrated circuit (IC) chip. In some embodiments, the coil L, the nitride-based bidirectional switch Q, the capacitor C1, the rectifying circuit 30 and the controlling circuit 50 may be integrated in an integrated circuit (IC) chip.

Figure 11:
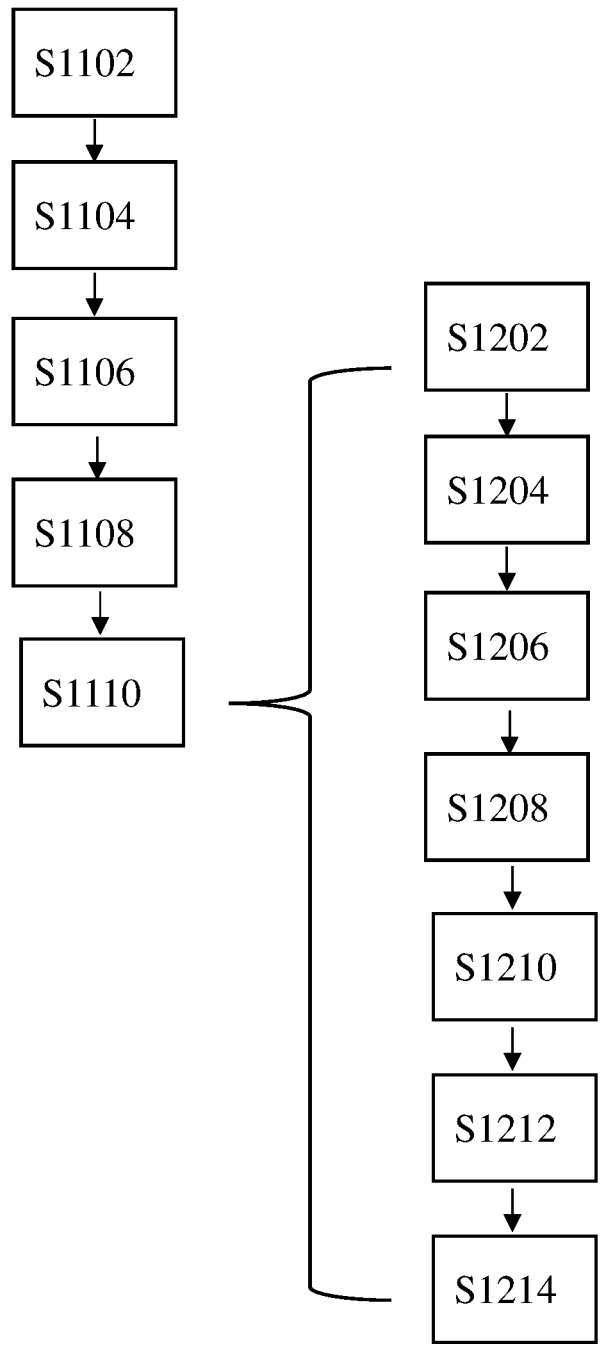
FIG. 11 depicts a flow chart of a method for implementing a nitride-based PFC circuit according to one embodiment of the present invention.

FIG. 11 depicts a flow chart of a method for implementing a nitride-based PFC circuit according to one embodiment of the present invention. The nitride-based PFC circuit may have a pair of first and second input terminals, a pair of first and second output terminals, a coil, a nitride-based bidirectional switch, a capacitor, a rectifying circuit and a controlling circuit. Referring to FIG. 11, the method may comprise the following steps:

S1102: connecting a first end of a coil to the first input terminal;

S1104: connecting a first conduction terminal of a nitride-based bidirectional switch to a second end of the coil and connecting a second conduction terminal of the nitride-based bidirectional switch to the second input terminal;

S1106: connecting a first end of a first capacitor to the first output terminal and connecting a second end of the first capacitor to the second output terminal;

S1108: implementing a rectifying circuit by: connecting a first diode between the coil and the first output terminal; connecting a second diode between the second output terminal and the coil; connecting a third diode between the second input terminal and the first output terminal; and connecting a fourth diode between the second output terminal and the second input terminal;

S1110: implementing a controlling circuit and connecting the first switching node of a controlling circuit to a first control terminal of the bidirectional switch and connecting a second switching node of the controlling circuit to a second control terminal of the bidirectional switch.

The implementation of the controlling circuit may comprise the following steps:

S1202: configuring a controller to generate a main control signal;

S1204: configuring a low-dropout module to receive a DC power supply and generate a regulated voltage;

S1206: connecting a step-up converter to the low-dropout module and configuring the step-up converter to receive the regulated voltage and generate a stepped-up voltage;

S1208: connecting a non-isolation driver to the controller and the low-dropout module and configuring the non-isolation driver to receive the main control signal and the regulated voltage and generate a first driving signal;

S1210: connecting a first delay module to the non-isolation driver and configuring the first delay module to receive the first driving signal and generate a first switching signal to the first control terminal of the bidirectional switch;

S1212: connecting an isolation driver to the controller, the low dropout module and the step-up converter and configuring the isolation driver to receive the main control signal, the regulated voltage and the stepped-up voltage and generate a second driving signal; and S1214: connecting a second delay module to the isolation driver and configuring the second delay module to receive the second driving signal and generate a second switching signal to the second control terminal of the bidirectional switch.

The embodiments were chosen and described in order to best explain the principles of the invention and its practical application, thereby enabling others skilled in the art to understand the invention for various embodiments and with various modifications that are suited to the particular use contemplated. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations. While the apparatuses disclosed herein have been described with reference to particular structures, shapes, materials, composition of matter and relationships . . . etc., these descriptions and illustrations are not limiting. Modifications may be made to adapt a particular situation to the objective, spirit and scope of the present disclosure. All such modifications are intended to be within the scope of the claims appended hereto.

The invention claimed is:

1. A nitride-based power factor correction (PFC) circuit for improving power distribution efficiency from an AC power supply to a load, comprising: a pair of first and second input terminals coupled to the AC power supply; a pair of first and second output terminals coupled to the load; a coil having a first end connected to the first input terminal; a nitride-based bidirectional switch having a first conduction terminal connected to a second end of the coil and a second conduction terminal connected to the second input terminal; a first capacitor having a first end connected to the first output terminal and a second end connected to the second output terminal; a rectifying circuit coupled between the AC power supply and the load; and a controlling circuit having a first switching node and a second switching node electrically coupled to a first control terminal and a second control terminal of the bidirectional switch respectively; and wherein the controlling circuit comprises: a controller configured for generating a main control signal; a low-dropout module configured for receiving a DC power supply and generating a regulated voltage; a step-up converter connected to the low-dropout module and configured for receiving the regulated voltage and generating a stepped-up voltage; a non-isolation driver connected to the controller and the low dropout module, and configured for receiving the main control signal and the regulated voltage and generating a first driving signal; a first delay module connected to the non-isolation driver and configured for receiving the first driving signal and generating a first switching signal to the first control terminal of the bidirectional switch; an isolation driver connected to the controller, the low dropout module and the step-up converter, and configured for receiving the main control signal, the regulated voltage and the stepped-up voltage and generating a second driving signal; and a second delay module connected to the isolation driver and configured for receiving the second driving signal and generating a second switching signal to the second control terminal of the bidirectional switch.

2. The nitride-based power factor correction circuit according to claim 1, wherein rectifying circuit comprises:
a first diode having an anode connected to the coil and a cathode connected to the first output terminal;
a second diode having an anode connected to the second output terminal and a cathode connected to the coil;
a third diode having an anode connected to the second input terminal and a cathode connected to the first output terminal; and
a fourth diode having an anode connected to the second output terminal and a cathode connected to the second input terminal.

3. The nitride-based power factor correction circuit according to claim 1, wherein:

when the AC power supply is operated at a positive half-cycle, the controlling circuit is configured to:
control the bidirectional switch to an on-state so as to facilitate a current to flow along a first current path including the coil L and the bidirectional switch; or
control the bidirectional switch to an off-state so as to facilitate a current to flow along a second path including the coil L, the first diode, the capacitor D1, the load and the fourth diode; and
when the AC power supply is operated at a negative half-cycle, the controlling circuit is configured to:
control the bidirectional switch to the on-state so as to facilitate a current to flow along a third path including the bidirectional switch and the coil L; or
control the bidirectional switch to the off-state so as to facilitate a current to flow along a fourth path including the third diode, the capacitor C1, the load, the second diode and the coil L.

4. The nitride-based power factor correction circuit according to according to claim 1, wherein the low dropout module comprises: a low-dropout regulator (LDO) having an input connected to an input terminal of the low-dropout module, an output connected to an output terminal of the low-dropout module and a ground connected to an internal ground terminal of the low-dropout module; a second capacitor having one end connected to the input terminal of the low-dropout module and the other end connected to the internal ground terminal of the low-dropout module; and a third capacitor having one end connected to the output terminal of the low-dropout module and the other end connected to the internal ground terminal of the low-dropout module.

5. The nitride-based power factor correction circuit according to according to claim 1, wherein the step-up converter comprises:
a fifth diode having an anode connected to an input terminal of the step-up converter and a cathode connected to an output terminal of the step-up converter; and
a fourth capacitor having one end connected to the output terminal of the step-up converter and the other end connected to the internal ground terminal of the step-up converter.

6. The nitride-based power factor correction circuit according to claim 1, wherein the first delay module comprises:
a first resistor having one end connected to an input terminal of the first delay module;
a second resistor having one end connected to the input terminal of the first delay module and the other end connected to an output terminal of the first delay module; and
a sixth diode having an anode connect to the output terminal of the first delay module and a cathode connected to the other end of the first resistor.

7. The nitride-based power factor correction circuit according to claim 1, wherein the second delay module comprises:
a third resistor having one end connected to an input terminal of the second delay module;
a fourth resistor having one end connected to the input terminal of the second delay module and the other end connected to an output terminal of the second delay module; and
a seventh diode having an anode connected to the output terminal of the delay module and a cathode connected to the other end of the third resistor.

8. The nitride-based power factor correction circuit according to claim 1, wherein the nitride-based bidirectional switch is a nitride-based dual-gate transistor having:
a source electrode being the first conduction terminal;
a drain electrode being the second conduction terminal;
a first gate electrode being the first control terminal; and
a second gate electrode being the second control terminal.

9. The nitride-based power factor correction circuit according to claim 8, wherein the nitride-based dual-gate transistor is a nitride-based dual-gate high-electron-mobility transistor (HEMT).

10. The nitride-based power factor correction circuit according to claim 9, wherein the nitride-based dual-gate HEMT is a nitride-based dual-gate enhancement-mode (E-mode) HEMT.

11. The nitride-based power factor correction circuit according to claim 10, wherein the nitride-based dual-gate E-mode HEMT is a AlGaN/GaN dual-gate E-mode HEMT.

12. The nitride-based power factor correction circuit according to claim 1, wherein the nitride-based bidirectional switch and the controlling circuit are integrated in an integrated circuit chip.

13. The nitride-based power factor correction circuit according to claim 1, wherein the coil, the nitride-based bidirectional switch, the capacitor and the rectifying circuit are integrated in an integrated circuit chip.

14. The nitride-based power factor correction circuit according to claim 1, wherein the coil, the nitride-based bidirectional switch, the capacitor, the rectifying circuit and the controlling circuit are integrated in an integrated circuit chip.

15. A method for implementing a nitride-based power factor correction (PFC) circuit having a pair of first and second input terminals and a pair of first and second output terminals, the method comprises: connecting a first end of a coil to the first input terminal; connecting a first conduction terminal of a nitride-based bidirectional switch to a second end of the coil and connecting a second conduction terminal of the nitride-based bidirectional switch to the second input terminal; connecting a first end of a first capacitor to the first output terminal and connecting a second end of the first capacitor to the second output terminal; implementing a rectifying circuit by: connecting a first diode between the coil and the first output terminal; connecting a second diode between the second output terminal and the coil; connecting a third diode between the second input terminal and the first output terminal; connecting a fourth diode between the second output terminal and the second input terminal; implementing a controlling circuit and connecting the first switching node of a controlling circuit to a first control terminal of the bidirectional switch and connecting a second switching node of the controlling circuit to a second control terminal of the bidirectional switch; and wherein the implementation of the controlling circuit comprises: configuring a controller to generate a main control signal; configuring a low-dropout module to receive a DC power supply and generate a regulated voltage; connecting a step-up converter to the low-dropout module and configuring the step-up converter to receive the regulated voltage and generate a stepped-up voltage; connecting a non-isolation driver to the controller and the low-dropout module and configuring the non-isolation driver to receive the main control signal and the regulated voltage and generate a first driving signal; connecting a first delay module to the non-isolation driver and configuring the first delay module to receive the first driving signal and generate a first switching signal to the first control terminal of the bidirectional switch; connecting an isolation driver to the controller, the low dropout module and the step-up converter and configuring the isolation driver to receive the main control signal, the regulated voltage and the stepped-up voltage and generate a second driving signal; and connecting a second delay module to the isolation driver and configuring the second delay module to receive the second driving signal and generate a second switching signal to the second control terminal of the bidirectional switch.

16. The method according to claim 15, further comprising integrating the nitride-based bidirectional switch and the controlling circuit in an integrated circuit chip.

17. The method according to claim 15, further comprising integrating the coil, the nitride-based bidirectional switch, the capacitor and the rectifying circuit in an integrated circuit chip.

18. The method according to claim 15, further comprising integrating the coil, the nitride-based bidirectional switch, the capacitor, the rectifying circuit and the controlling circuit in an integrated circuit chip.

* * * * *